(12) United States Patent
Clark

(10) Patent No.: US 6,873,649 B1
(45) Date of Patent: Mar. 29, 2005

(54) METHOD AND APPARATUS FOR DETECTING A STATIONARY DITHER CODE

(75) Inventor: James M. Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 663 days.

(21) Appl. No.: 09/711,156

(22) Filed: Nov. 13, 2000

Related U.S. Application Data

(60) Provisional application No. 60/164,946, filed on Nov. 12, 1999, provisional application No. 60/164,952, filed on Nov. 12, 1999, and provisional application No. 60/164,951, filed on Nov. 12, 1999.

(51) Int. Cl.[7] .......................... H04B 15/00; H04K 1/00
(52) U.S. Cl. ...................... 375/150; 375/149; 380/274
(58) Field of Search ............................... 375/149–152, 375/343; 380/274; 368/202; 714/701

(56) References Cited

U.S. PATENT DOCUMENTS

| | | | | |
|---|---|---|---|---|
| 5,271,034 A | * | 12/1993 | Abaunza ...................... | 375/150 |
| 5,535,278 A | * | 7/1996 | Cahn et al. .................. | 308/274 |
| 6,385,232 B1 | * | 5/2002 | Terashima ................... | 375/149 |

OTHER PUBLICATIONS

Ananda, M.P., et al., Satellite Navigation Systems, Autonomous Navigation of the Global Positioning System Satellites, McGraw–Hill Encyclopedia of Science and Technology, pp. 53–59, 1986.

Ananda, M.P. et al., Autonomous Navigation of the Global Postitioning System Satellites, The AIAA Guidance and Control Conference, Aug. 20–22, 1984, pp. 1–11.

Spilker, Jr., J.J. "GPS Signal Structure and Performance Characteristics", pp. 29–54, Global Positioning System, The Institute of Navigation, vol. 1, 1980.

Glazer, B.G., "GPS Receiver Operation", pp. 81–86, Global Positioning System, The Institute of Navigation, vol. 1, 1980.

Winch, Robert G., Telecommunication Transmission System (Second Edition), Copyright 1998, 1993 by McGraw–Hill, pp. 128–135.

* cited by examiner

*Primary Examiner*—Young T. Tse
*Assistant Examiner*—Edith Chang
(74) *Attorney, Agent, or Firm*—Edell, Shapiro, & Finnan, LLC

(57) ABSTRACT

An apparatus and method of detecting a transmission code from a received signal, where the transmission code is composed of a plurality of dithered codes. The codes can be dithered either by varying the length of the code or varying the phase of the code according to a dither pattern and can be a stationary dither pattern that is fixed and generally known. The method includes detecting the plurality of dithered codes, and detecting the long code based on the detected dithered codes. A detection signal is generated for each detected dither code, the detection signals are combined, and the long code is detected based on the combination of detection signals. If the composite code includes M dithered codes, the correlation signals are combined by summing the M correlation sums to generate a present final sum. The long code is detected by determining a largest final sum from among the present final sum and previously generated final sums, and associating a time of the largest final sum with the time of the transmission code.

10 Claims, 10 Drawing Sheets

FIG.3A BOUNDARY DITHER:

FIG.3B ROTATION DITHER:

FIG.3C ALIGNED REFERENCE CODES:

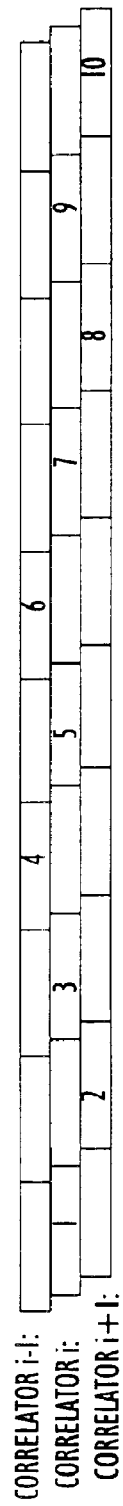
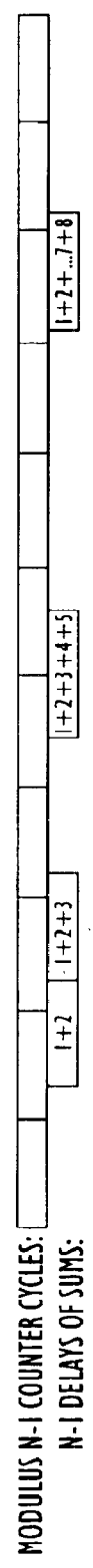
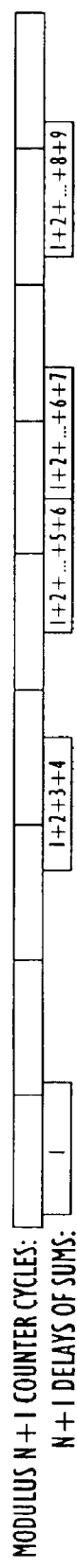
FIG.6A
FIG.6B
FIG.6C
FIG.6D

METHOD AND APPARATUS FOR DETECTING A STATIONARY DITHER CODE

CROSS REFERENCE TO RELATED APPLICATION

This application claims priority from U.S. Provisional Patent Application Ser. No. 60/164,946, entitled "Stationary Dither Code Detection," No. 60/164,952, entitled "Optimal Stationary Dither Code," and No. 60/164,951 entitled "Non-stationary Dither Code Detection," all filed Nov. 12, 1999. The disclosure of these provisional patent applications are incorporated herein by reference in its entirety.

BACKGROUND OF THE INVENTION

1. Field of the Invention

The present invention relates to data communication systems and, more particularly, to data communication systems using codes with coding boundaries that vary according to a dithering pattern.

2. Description of the Related Art

Pseudonoise (PN) codes, also known as pseudorandom codes, have good autocorrelation properties and are ideal for measuring the time-of-arrival of a signal, and hence, for use in ranging applications. A high coding gain is achieved when a receiver correlates the code, such as a PN code, for a long time. Accordingly, long PN codes have been used to provide high coding gain.

An example of using a long PN code is in the Global Positioning System (GPS). GPS is a satellite-based navigation system in which each satellite in the GPS constellation transmits a unique precision (P) code. Each P code is a very long PN code that has a period of one week, and hence, repeats only once per week. The P code provides for a high gain correlation signal that allows a receiver to acquire precise timing information, and hence, precise ranging information between the receiver and satellite. To acquire the P code signal a receiver must determine the phase of the received P code. However, because the P code is so long it is difficult for a receiver to determine its phase and therefore is difficult to acquire. If a receiver includes a very accurate clock, such as an atomic clock, it might stay synchronized with the transmitter's clock and could therefore generate a local reference P code that is nearly in-phase with the received P code. But this would require an expensive, complex and unwieldy receiver. Even with a very accurate and stable clock frequency, there is the problem of initially setting the correct time of day. This requires testing all of the code phases that span the range of the time uncertainty. Theoretically a receiver could include enough correlators to test each phase of the P code simultaneously to detect its phase, but in practice that solution would not be feasible because of the extremely large number of correlators required due to the length of the P code. A receiver also, theoretically, could use a practical number of correlators and test the possible phases of the P code sequentially, however, that would take a long time due to the length of the P code.

The GPS system uses another technique to acquire the P code. It uses a second signal, known as the course acquisition (C/A) signal, to determine initial timing information, then it uses that timing information to assist in detecting the phase of the P code. The C/A signal is a much shorter code of 1023 symbols and repeats approximately every millisecond. Accordingly, the C/A code can be detected quickly, either by using a bank of correlators to test each possible phase of the code simultaneously, or by testing the phases in sequence. However, the C/A code can provide timing only within one millisecond interval, because one such interval cannot be distinguished from another, and thus, by itself, cannot resolve all of the time uncertainty, which typically is a few seconds. But once a GPS receiver acquires the C/A signal it can determine enough timing information to limit the P code search to specific phases of the P code to speed its acquisition of the P code. However, using an ancillary code to help acquire a longer code, such as in the GPS system, requires that the transmitter generate and transmit two signals and that a receiver be able to receive and detect both signals.

Accordingly, there is a need to generate, transmit and receive a long code with good autocorrelation characteristics that can be acquired quickly using a feasible number of correlators and without requiring another signal that provides timing information.

A conventional spread-spectrum communications system, such as the GPS system, is shown in FIG. 1. The system of FIG. 1 includes a transmitter 1 and a receiver 9. The transmitter includes a PN code generator 2 that is controlled by a timing counter and both are driven based on a clock oscillator 4. The PN code generated by generator is modulated with a carrier signal via modulator 5 which is driven by carrier oscillator 6. Optionally, data can be superimposed onto the code and carrier by using a modulo 2 adder 7. The transmitter 1 transmits the modulated carrier via antenna 8 to a receiver 9.

Receiver 9 receives the transmitted signal via an antenna 10 that provides the received signal to a demodulator 11. The demodulator 11 is driven by a carrier oscillator 12, and produces two signals out-of-phase by 90°. Those signals are designated as in-phase (I) and quadrature(Q) signals. These two out-of-phase signals are provided to a group of parallel correlators 13. The parallel correlators can include as many, and even more, correlators as the number of phases of the code to be tested. For example, if the code length is 1023 symbols, or chips, the parallel correlators 13 can consist of 1023 correlators, with one correlator for each possible phase of the code. Multiple banks of the parallel correlators 13 can be used to correlate different signals, such as in this case where one bank correlates the I-signals and another bank correlates the Q-signals. The parallel correlators 13 are also provided with PN reference codes that correspond to the PN codes generated in the transmitter. PN code generator 14 generates the reference codes. The reference codes can be delayed to correspond to the various phases to be tested. Alternatively, the input signals, here the I and Q signals, can be delayed with various delays and correlated with a single PN code to test the different phases. The PN code generator 14 is driven by a local clock oscillator 15 and timing counters 16 which can produce the different timings for the PN reference codes. The local clock oscillator also drives timing counters 16.

Many different types of PN code generators can be used in spread-spectrum systems such as that shown in FIG. 1. One such conventional, simplified PN code generator is shown in detail in FIG. 2. The PN code generator of FIG. 2 includes a shift register 20 and a modulo-2 adder 21. In this example, the shift register is six bits long, although it can be longer or shorter as needed. The six flip-flops of shift register 20 are synchronously driven by a clock signal. Modulo-2 adder 21 adds the first and sixth bits of the shift register, and inserts the result into the first position of register 20. In this manner, a maximal-length PN sequence is produced.

The GPS receiver 9, shown in FIG. 1, requires two PN code generators. One of the PN generators, similar in concept to the generator shown in FIG. 2, generates the P code and another, also similar to that shown in FIG. 2, generates the C/A code. Although only one generator is shown in the FIG. 1 it will be understood that in the case of a long code system, such as GPS, two generators are used. Also, the receiver, in the threshold detection function 17, must be able to detect both the P and C/A codes. Accordingly, conventional spread-spectrum receivers, such as GPS receivers, suffer from the problems described above and are unable to detect a long code quickly and inexpensively without the aid of a second timing signal. Accordingly, there is a need for a receiver that can detect a long code with good autocorrelation properties, yet can acquire it quickly and inexpensively without the need for first detecting a second timing signal.

SUMMARY OF THE INVENTION

Therefore, in light of the above, and for other reasons that become apparent when the invention is fully described, an object of the present invention is to detect a long code from a sequence of shorter codes, where the shorter codes are dithered versions of the same short code.

A further object of the present invention is to use a single pseudonoise reference code generator to generate a single reference code to acquire a long code composed of a sequence of dithered short codes.

Yet a further object of the present invention is to detect a long code having a predetermined dither pattern.

Another object of the present invention is to determine a maximum correlation value from a plurality of correlation signals produced by a plurality of correlators.

Yet another object of the invention is to detect a sequence of dithered short code composing a long code.

A further object of the invention is arrange correlation results representing candidate matches of a long code so the most likely candidate for the match is readily available for a access by a processing unit.

A still further object of the present invention is to provide an apparatus that achieves one or more of the above objects.

The aforesaid objects are achieved individually and in combination, and it is not intended that the present invention be construed as requiring two or more of the objects to be combined unless expressly required by the claims attached hereto.

In accordance with one aspect of the present invention, there is provided a method of detecting a transmission code from a received signal, where the transmission code is composed of a plurality of dithered codes. The method includes detecting the plurality of dithered codes, and detecting the long code based on the detected dithered codes. The method generates a detection signal for each detected dithered code, combines the detection signals, and detects the long code based on the combination of detection signals. In the case where the composite code includes M dithered codes, the correlation signals can be combined by summing the M correlation sums to generate a present final sum. The long code can be detected by determining a largest final sum from among the present final sum and previously generated final sums where one of the sums will be large because those M correlation sums align with the M dither codes in the received signals. By associating a time of the largest final sum with the time of the transmission code, the timing of the long code is determined. The dither pattern can be a stationary dither pattern, that is fixed and well-known.

According to another aspect of the invention there is provided a dither code detector that receives a coded signal having a long code composed of a plurality of dithered codes, where the dithered codes are dithered according to a dither pattern. The detector includes a correlator unit that correlates a coded signal with a reference code and outputs a correlation signal. It also includes a detector that combines portions of the correlation signal, corresponding to the dithered codes, and detects the long code based on the combined portions of the correlation signal. The detector can include a delay unit, such as a series of RAMs, that receives the correlation signals and delays them according to the dither codes. It can also include a combiner that receives the present correlation signal and combines it with the delayed correlation signals, to generate a combined correlation signal. This delaying and combining is performed for each delay code in the composite code, and the final combiner outputs a final correlation sum that represents the sum of the correlations of the individual dither codes over the entire period of the long code. When the correlation for the last dithered code is input to the delay unit, and hence, the end of the long code enters the delay unit, then the detector will output a strong final correlation sum near the end of the long code. Time information is associated with the correlation signals, and when the strong final combined correlation occurs, the time of the beginning of the long code can be determined from the time information. The RAMs can delay the correlation sums by being addressing with a modulo counter using a modulus corresponding to the amount of dither being detected.

The above and still further objects, features and advantages of the present invention will become apparent upon consideration of the following descriptions and descriptive figures of specific embodiments. While these descriptions go into specific details of the invention, it should be understood that variations may and do exist and would be apparent to those skilled in the art based on the descriptions herein.

BRIEF DESCRIPTION OF THE DRAWINGS

FIG. 3A shows an example boundary dither code.

FIG. 3B shows an example rotation dither code.

FIG. 3C shows alignments of a reference code with the boundary dither and rotation dither codes shown in FIGS. 3A and 3B that a receiver might use to detect either of the dither codes shown in FIGS. 3A and 3B.

FIGS. 6A–D are code timing diagrams for showing the operation of the maximum likelihood decoder shown in FIG. 5.

DESCRIPTION OF THE PREFERRED EMBODIMENTS

Figure 1:
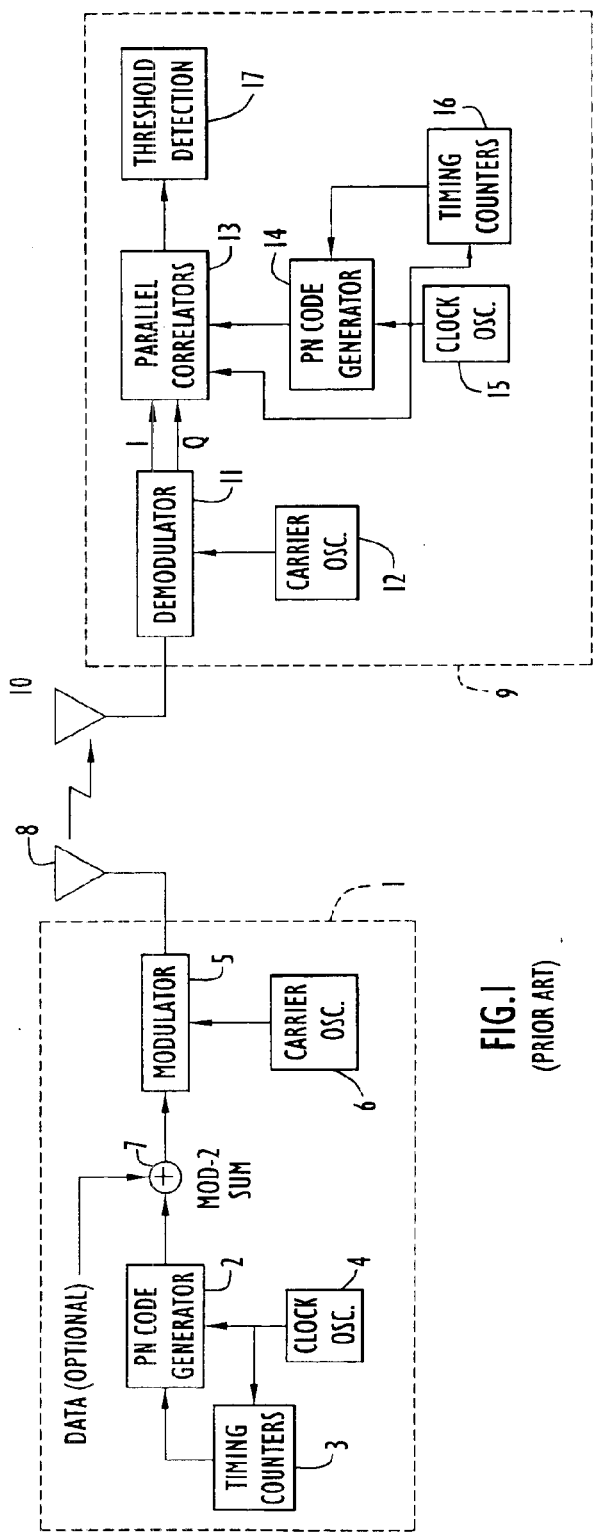
FIG. 1 is a block diagram of a conventional spread-spectrum communication system.

Preferred embodiments according to the present invention are described below with reference to the above drawings, in which like reference numerals designate like components.

Overview

A co-pending patent application, entitled "Method and Apparatus for Generating and Transmitting a Stationary Dither Code," relates to generating and transmitting stationary dither codes, including an optimal dither code, and is incorporated herein by reference. In that co-pending patent application the generation and transmission of stationary dither codes and optimal stationary dither codes are described, as is the code structure that typically would be used in a data communications transmitter. The present invention is directed to methods and apparatuses for detecting any stationary dither code, both optimal and non-optimal stationary dither codes. Such methods and apparatuses typically would be used in a data communications receiver. In the following description of the invention a simple, non-optimal code is used for purposes of illustrating the invention. However, the invention is not limited to such a code, and applies to detecting any stationary dither code.

Dither Types

A dither code can be generated from a predetermined code, by changing certain aspects of that predetermined code. There are many PN codes that can be used, such as m-sequences produced by a generator such as that shown in FIG. 2. For example, a reference code N chips, or bits, long with good autocorrelation properties is selected. A code generator can generate a long code by repeating the reference code M times. However, so that a receiver can distinguish one part of the long code from another, the generator varies the timing, or dithers, the repetitions of the reference code. The varied timing repetitions of the reference code are referred to here as short codes. The original undithered code is referred to here as the reference code, because a receiver typically will generate the reference code and use it as a reference to detect the dithered short codes.

One kind of dither is a boundary dither that is created by varying the lengths of the short codes by small amounts. All of the short codes start the same way, but a generator adds or deletes bits at the ends of the codes in order to vary the length of the reference code. The boundaries between the short codes are thus not equally-spaced, but are varied by the dither pattern. The length of the long code is nominally M·N chips, but perhaps not exactly that length, because of the length variations due to the boundary dither.

Another kind of dither is rotation dither, performed by rotating the short codes, yet keeping the code length constant. That is, the short codes start in varying states, or at varying phases of the code, and each rotation dithered short code includes the entire reference code. The boundaries between the rotation dithered short codes are equally-spaced since the code lengths are the same, but there remains one feature in common with the boundary dither. Namely, if a dithered code is compared with an undithered code, the code phase of the short codes will appear to shift back and forth in some pattern referred to here as the dither pattern. The length of the long code is exactly MAN symbols, or chips, in the case of rotation dither.

Here, the dither patterns, also called dither codes, are fixed, and thus they are referred to as stationary dither codes. Here too, the long code has a constant length in each repetition of the long code.

FIGS. 3A–C illustrate the two types of dither with a small-scale example, in which the 7-bit code "0010111" is repeated four times. Dithering that 7-bit reference code by the boundary dither method varies the lengths of the codes. The codes marked in FIG. 3A as (−1) are one bit shorter, and those marked (+1) are one bit longer than the reference code.

Dithering the 7-bit reference code by the rotation dither method shifts the codes. The codes marked in FIG. 3B as (−1) are rotated one bit to the left, those marked (+1) are rotated one bit to the right, and those marked (0) are not rotated.

For either type of dither, a receiver can generate a reference code (an unmodified 7-bit code) and find phase shifts of the reference code that are aligned with the received codes, as illustrated in FIG. 3C. The aligned reference codes and received codes will match almost entirely, except for a few bits at the ends of the codes, and thus, will produce a strong correlation. Accordingly, a code with a long period can be generated using only a single, short reference code.

Short Code Detection

Figure 2:
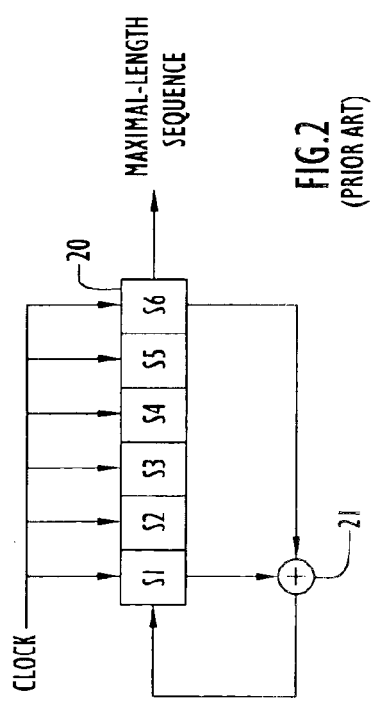
FIG. 2 shows a conventional pseudonoise generator.
Figure 4:
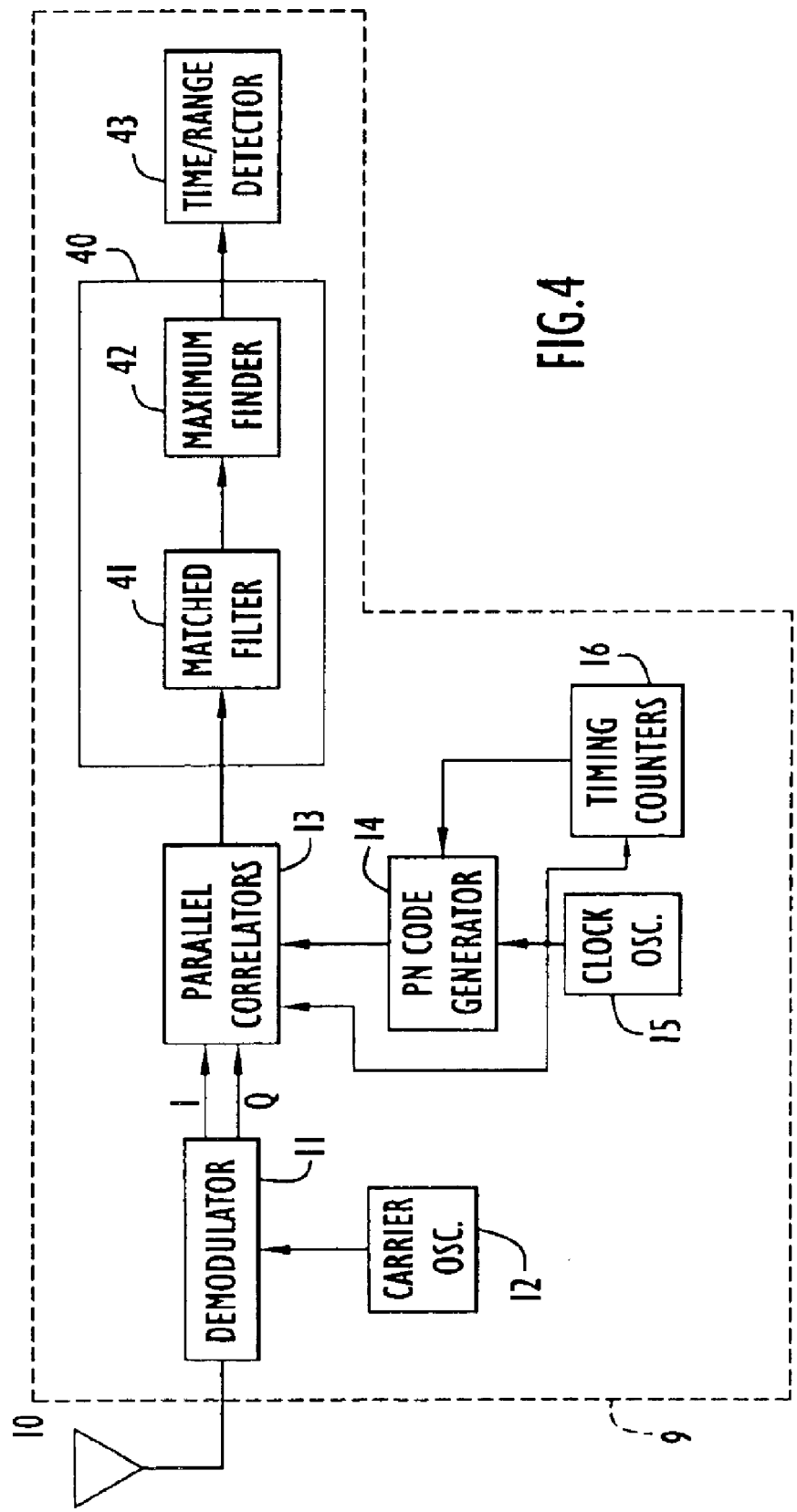
FIG. 4 is a block diagram of a receiver according to one embodiment of the invention.

A receiver according to one embodiment of the invention is shown in FIG. 4. Here, many of the front-end components of the conventional receiver 9 shown in FIG. 2 are used, up through the parallel correlators 13, although only one reference PN code generator 14 is needed. However, the threshold detection functional unit 17 of the conventional receiver is replaced with a maximum likelihood decoder 40 and a time/range detector 42, as shown in FIG. 4.

The dithered short codes, composing the received long code, are detected by a set of correlators 13 that correlate the received signal with various time delays of an undithered reference code. The undithered reference code has N symbols and is produced by PN code generator 14. Here, the correlator unit 13 includes two banks of correlators to process the I and Q signals, and each bank includes N correlators, using delays of 0, 1, 2, . . . N−2, N−1 symbols, or chips. Generally, correlators are provided at half-chip spacing, but for ease of explanation and understanding, the correlator unit 13 provides one correlator per symbol in the undithered code. The correlators are dumped sequentially and cyclically; that is, the correlator units dump them in the sequence 0, 1, 2, . . . N−2, N−1, 0, 1, 2, . . . (using the delay values to identify the correlators). In each code interval, one of the correlators will be best aligned with the received code, and will match most of the N chips of the reference code. More precisely, either the received code will be exactly aligned with one of the correlators, giving it maximum detection, or the received code will be aligned halfway between two adjacent correlators, giving each half the maximum, or some combination between these extremes.

Generally, not all of the N chips of the reference code are matched because the short codes in the received signal are dithered. Accordingly, there is loss of gain due to all of the dithered signal not being correlated with the receiver's reference code. In order to minimize this loss of gain a transmitter produces the short codes by dithering them only by small amounts. Both boundary and rotation types of dither have this small loss of gain characteristic. In the case of boundary dither, the unmatched bits occur at the end of the short codes; and in case of rotation dither, the unmatched bits occur at both ends of the short codes.

The parallel correlator unit 13 output correlation sums. The sum is large when the received signal correlates strongly with the reference code. Accordingly, the correlators detect the short codes when the correlation is strong and the correlation sum output is large.

Dither Code Detection

Because the dither code is fixed, or stationary, the dither pattern is known ahead of time and the receiver can be designed to detect it. Thus, a receiver designed for a specific dither pattern used by a transmitter can detect the dither pattern by summing appropriate sequences of the correlator outputs and finding the highest total correlation. A high total correlation summed over sequences of the correlator outputs corresponding to the dither pattern indicates that the receiver has detected the phase of the dither pattern, and thus, that it has detected the phase of the long code, that is, the time of arrival of the long code. Once the receiver detects the phase of the long code it can process the long code such as by determining timing information and/or range information based on the long code.

The receiver 9 shown in FIG. 4 detects the dither code using a maximum-likelihood decoder 40. The maximum likelihood decoder 41 decodes the received signal by using a matched filter 41 and detects the dither code (for either type of dither) by using a maximum finder 42 that processes the output of the matched filter 31. The matched filter sums sequences of correlation signals output from the parallel correlators 13 over a period time corresponding to the period of the dither code. The maximum finder 42 arranges the sums output from the matched filter to store them in order of the strength of the sums, where the strongest sum corresponds to the best indication of the phase of the dither code. The sums arranged by the maximum finder 42 are made available for processing by time/range detector 43. By arranging the sums in strength order, the most appropriate sums, i.e., those most likely to correspond to the long code, are readily available to be provided quickly to a processing unit. The maximum likelihood decoder 40 will now be described in detail.

Maximum-Likelihood Decoder

Figure 5A:
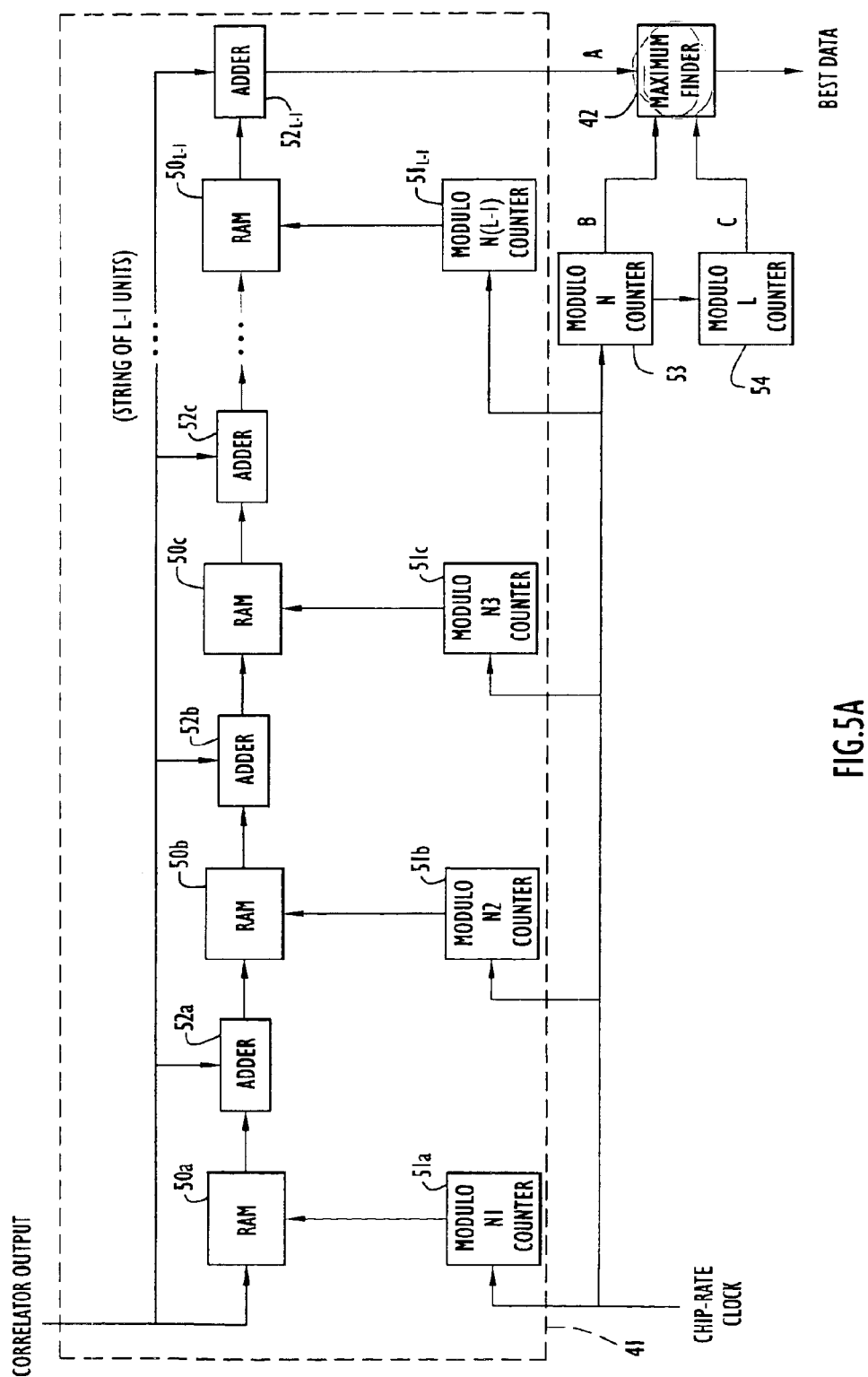
FIG. 5A is a block diagram of the maximum likelihood decoder shown in FIG. 4.

One embodiment of the maximum likelihood decoder 40 is shown in FIG. 5A, and includes a matched filter 41, matched to the signal structure, receiving the output from parallel correlators 13 and outputting a sum "A" to maximum finder 42.

The correlator output comes from a set of N correlators that correlate the received signal with an undithered reference signal delayed 0, 1, 2, . . . N−2, and N−1 chips. Because the correlators are dumped sequentially and cyclically, this output is a sequence of correlation sums output at the chip rate in the order of the delay values. Those correlation sums are input to the matched filter 41.

Matched filter 41 includes a series of delay units, in this case random access memories (RAMs), counters and adders. For a long code composed of L short codes, the decoder needs L−b 1RAMs and L−1 adders as shown in FIG. 5A. Accordingly, the matched filter 41 includes (RAMs) $50_a$ through $50_{L-1}$, modulo counters $51_a$ through $51_l$, and adders $52_a$ through $52_{L-1}$. The counters count modulo N1, N2, N3, etc. as shown in the figure, where each modulus is set equal to the length of one of the short codes in the case of boundary dither, or equal to the short code length plus the equivalent phase shift values in the case of rotation dither. The matched filter also includes modulo N counter 53 and modulo L counter 54 which has a counting rate equal to the cycling rate of modulo N counter 53. The chip-rate clock is supplied to each of the modulo counters $51_a$ through $51_{L-1}$, and to modulo N counter 53 as shown in FIG. 5A, and controls the counting rate of those counters. The sequence of values provided by the series of delay units matches the dither pattern dither code.

The RAMs provide delay-line memory, and each RAM is addressed by a counter with a modulus equal to one of the dither code values N1, N2, N3, etc. The modulus value of each counter sets the data delay through the corresponding RAM. On each clock cycle, the addressed word is read (output) from the RAM and the same memory location is replaced by writing the input by using, for example, a read-modify-write cycle. For a counter modulus of, for example, N−1, if a correlator sum is written in clock cycle n, it will be read in clock cycle n+N−1, that is, after a delay of N−1 clock cycles. These counters do not need to be synchronized to any other timing to provide these delays. If two or more RAMs need the same delay, they may share the same counter, thus reducing the hardware cost.

Dither Code Correlation

The adders shown in FIG. 5A produce a sum of correlator sums that belong to the same dither code. This is best explained with an example using a boundary dither code with a small value of L. In this example there are ten (10) short codes in the long code, and hence L=10. Accordingly, the matched filter will include 9 RAM/adder units. The dither code values in this example are +1, −1, −1, +1, −1, +1, +1, −1, +1, −1. Accordingly, the lengths of the short codes will be N+1, N−1, N−1, N+1, N−1, N+1, N+1, N−1, N+1, N−1, respectively. The RAMs will therefore be connected to counters with moduli that match the first nine (9) of these lengths, in that order.

FIGS. 6A through 6D are timing diagram that illustrate how this code is detected. FIG. 6A shows the 10 short codes of the received dither code, and their lengths. It happens that in this example, just three of the correlators are involved in detecting this dither code.

FIG. 6B shows the staggered timing of outputs of these correlators, and which of the short codes are detected by which of the correlators. Note that in using a boundary dither, in this example, the start of the correlation intervals align with the short codes, but not the ends of the intervals.

Next, the top part of FIG. 6C shows the cycles of the counter with modulus N−1, and the bottom part of that figure shows the delays provided by the RAMs addressed by the counters with that modulus. FIG. 6D shows the cycles of the counters with modulus N+1, and the delays provided by RAMs addressed by those counters. For example, the delay of the sum of correlations for short codes 1 and 2 (shown in the bottom of FIG. 6C) begins when the delay for sum 1 ends (shown in the bottom of FIG. 6D) and also when the correlation for short code 2 ends (shown in FIG. 6B). Because the counter counts modulo N+1 the delay of short code 1 ends at the same part of the counter cycle as it began, and likewise with the N−1 counters.

Figure 7A:
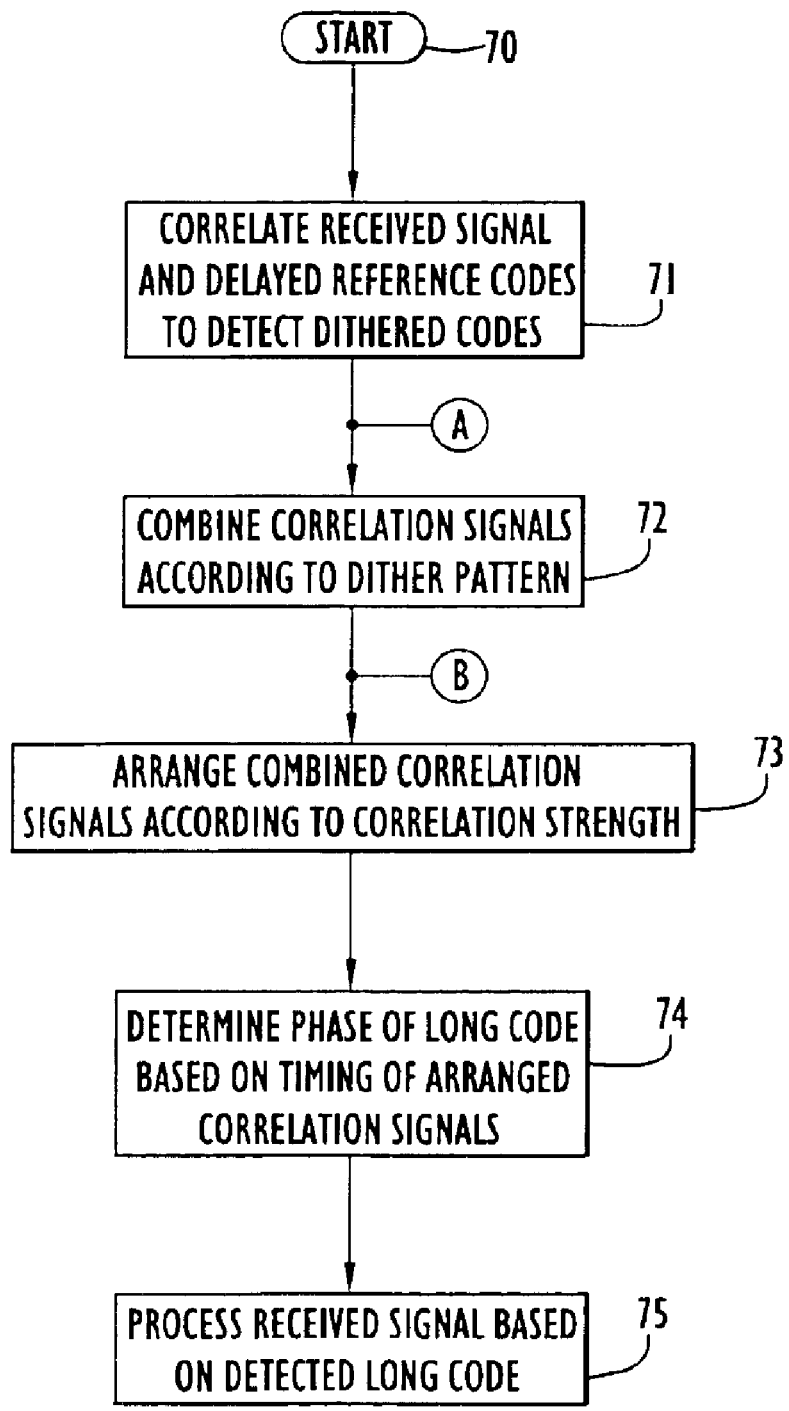
FIGS. 7A and B are flowcharts illustrating a method of detecting a stationary dither code according to the invention.

A process for detecting a long code composed of a sequence of shorter dithered codes is shown in FIG. 7A. The process starts at operation 70, and in operation 71 parallel correlators 13 correlate the received signal with delay reference codes provided by PN code generator 14, and they dump correlation sums to the maximum likelihood detector 40. The maximum likelihood detector's matched filter 41, in operation 72, combines the correlation signals according to a predetermined dither pattern identical to the dither pattern used by the transmitter in generating the transmitted long code, and outputs the combined correlation signals. Maximum finder 41, in operation 73, arranges the combined correlation signals according to their strength, with the strongest correlations being stored in a first location. The time/range detector 43, in operation 74, determines the phase of the long code based on the strength of the correlation signals stored in the maximum finder 42 and the receive times of those correlation signals. In operation 75 the time/range detector 43 processes the correlation signals output from the maximum finder 42 based on the detected phase of the long code, to determine timing information or ranging information from the long code.

Figure 7B:
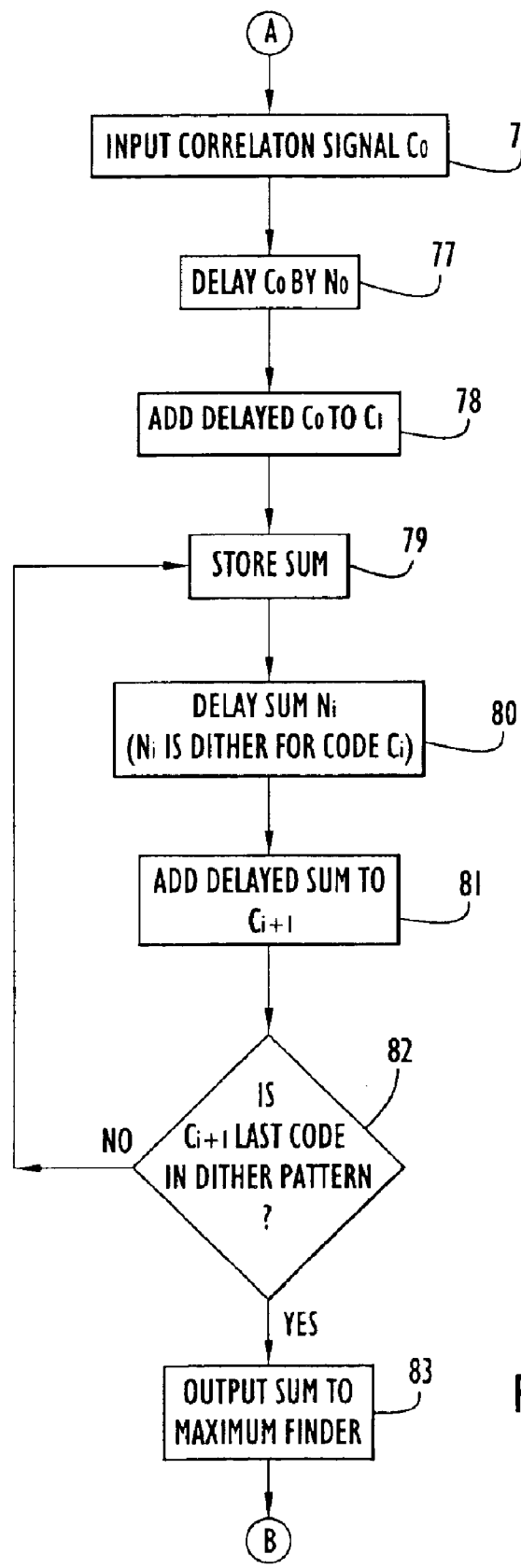

Next, a more detailed description of operation 72 and the matched filter 41 is provided with reference to FIGS. 5A and 7B.

N chips after the received dither code begins, one of the correlators, for instance, correlator i, which detected the first short code $C_0$, dumps its result to maximum likelihood detector 40, even though it did not examine the last chip of this code, as indicated in operation 76. The sum from correlator i is delayed by storing it in the first RAM $50_a$ (addressed with modulus N+1) at the location given by the current state of counter $51_a$, x, in operation 77.

One chip later, the second received short code $C_1$ begins.

N chips later, the second received short code C, is detected by correlator i+1, because the time is N+1 chips after the correlator i detection. The correlation result is strong even though the correlator has tried to examine one chip too many. The sum from correlator i+1 arrives at the first adder $52_a$. Since the time is now N+1 cycles after the first sum was stored in the first RAM 50 the address counter for the first RAM has advanced to x+N+1 modulo N+1, which equals x, so that the correlator sum for the first short code is now read from location x of RAM $50_a$, and also arrives at the first adder 52a at the same time as the second short code $C_1$. This adder, in operation 78, adds the sums for the first two short codes, and in operation 79 stores the result the second RAM $50_b$ (with modulus N+1) at the current state of its counter, y.

One chip earlier, the second of the received short codes had ended, and the third short code $C_2$ begins here.

N chips later, the third received short code $C_2$ is detected by correlator i, because the time is N−1 chips after the correlator i+1 detection. Again, the correlation result is strong even though the correlator has tried to examine one chip too many. The sum from correlator i (for the third short code) arrives at the second adder. Since the time is now N−1 cycles after the second sum was stored in the second RAM, thereby delaying; the second sum as indicated in operation 80, the address counter for the second RAM has advanced to y+N−1 modulo N−1, which equals y, so that the second sum is now read from RAM $50_b$, and also arrives at the second adder $52_b$. This adder, in operation 81, adds the correlator output for the third short code $C_2$ to the second sum to produce the third sum. Because there are still more codes to process in the dither pattern, as determined in operation 82, flow returns to operation 79 where the third sum is stored in the third RAM 50c.

This process continues until the sum of the correlations for the first nine short codes is read from the ninth RAM $50_{L-1}$, just as the correlation for the tenth short code $C_9$ is dumped. These two values are added by the last adder $52_{L-1}$ to obtain the total correlation for the dither code. Since the tenth short code is the last code in the dither pattern, as determined in operation 82, flow goes to operation 83, in which the final correlation sum is output to the maximum finder 42. Note that this time, when the final correlation sum is output from adder $52_{L-1}$, is not aligned with the end of the dither code. Rather, this time is a fixed delay (i.e., N·L+1 chips) from the start of the dither code and may not perfectly align with the end of the dither code because the varying length of the short codes while the correlators operate on a fixed length basis. That property is exhibited here, where the end of the dither code is not yet received at the time when adder $52_{L-1}$ outputs the final sum to the maximum finder.

Note that the final sums produced at times other than the time corresponding to the end of the long code will generally reflect the summing of a haphazard assortment of unaligned data that generally will produce small, weak values. Note also that other dither codes may arrive with other timing such that other correlators and other RAM words are involved, but the time of arrival of the final sum will always be the same delay from the start of the dither code.

The modulo-N counters and the modulo-L counter discussed below, shown in FIG. 5 are part of a chain of counters that define the local timing (uncorrected clock) of the receiver. The maximum finder uses these counters to record the time-of-arrival of the final sums. The maximum finder logic sorts the data as it arrives, keeping the data for the K highest correlations. K is a hardware cost parameter that will depend on the application. For some applications, K=1 may suffice. Basically, the maximum finder sifts out the best (or most promising) data for further analysis.

Figure 5B:
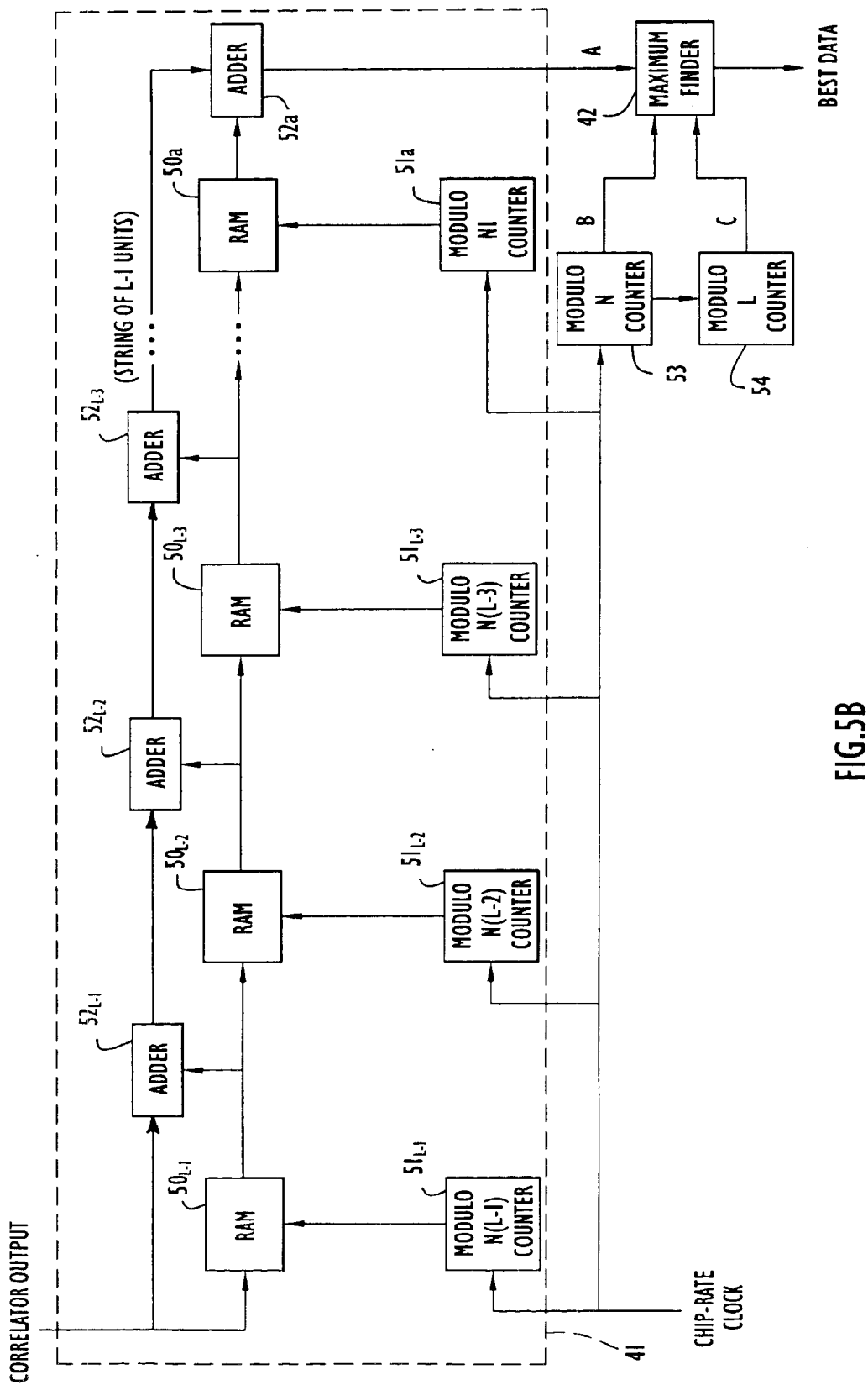
FIG. 5B is a block diagram of the maximum likelihood decoder shown in FIG. 4, according to another embodiment of the invention.

An alternate embodiment of the maximum finder and matched filter is shown in FIG. 5B. Here, the same components are used as in the matched filter shown in FIG. 5A, but they are arranged differently. In comparison to the matched filter in FIG. 5A, the adders in FIG. 5B are removed from between the RAMs, and the string of RAMs/counter pairs is reversed. Accordingly, the modulo N1 counter is placed at the output end of the filter, as shown, and the modulo N(L−1) counter is placed at the input end of the filter. The string of adders $52_{L-1}$ to $52_a$, receive as inputs the outputs of the respective RAMs and the output of the preceding adder. The last adder in the filter, adder 52a, supplies the output A to the maximum finder 42. The matched filter shown in FIG. 5B is an example of a matched filter that is a mathematically equivalent form of the matched filter shown in FIG. 5A, and can be used in place of the matched filter of FIG. 5A.

It will be understood that the matched filter according the present invention can be implemented in hardware, software or firmware.

Maximum Finder

If the application of the dither code detector is such that there is just one long code, as, for example, to mark the beginning of a message), then the processing needed for the output of the matched filter ("A" in FIGS. 5A and B) is as follows: Compare the output to a threshold value, and when the output exceeds the threshold, the long code will generally be detected. At this time, the outputs B and C of modulo N counter 53 and modulo L counter 54 will indicate the time of arrival of the long code, and this information can be used for ranging estimates, or message synchronization, or otherwise as useful to the application. The setting of the threshold will generally be important when noise is present at the receiver's input. If the threshold is too low, the detection decision can be accidently triggered by the noise; but if the threshold is too high, there may be no detection at all.

In other applications, the long code may be repeated, providing multiple opportunities for detection. Generally, these applications will be able to tolerate higher levels of noise than the applications described above. By combining the data from multiple long code detections, it is possible to get sufficiently reliable timing information when higher levels of noise are present at the receiver's input. However, under such high noise conditions, there will be many false (unaligned) correlations caused by the noise that are as strong as the correct (aligned) correlations.

It is common practice to use a computer and software, such as with the processing unit described below, to process correlation sums and associated timing information. But in the case of multiple code detections, the computer and software may not be able to keep pace with the data rate, in which case some data will be lost. If some data must be dropped, it will be best to retain the best data, that is, the strongest correlations, because these are less likely to be false correlations caused by noise. The purpose of, the maximum finder described next is to retain the best data in such a situation.

The maximum finder 42, also called a ranking list, sorts the sums as they are produced, placing the strongest sums in a list. This list stores the amplitudes of the final correlator sums, representing the strength of the correlations, and the received times of those correlations. The received time, also referred to as a time tag, represents the arrival time of the code boundary in terms of the receiver's local timing. The received time is derived from the receiver's local time using counters 53 and 54, when the correlation sum is transferred from the correlators to the maximum finder, which is typically one reference code length (nominal code length) after the beginning of the received code. Because the actual code length varies, the end of the received dither code is typically close to, but usually not exactly, when the received code ends.

When the list is full, correlations weaker than the weakest correlation in the list are discarded; and when a new correlation is added to the list, the weakest correlation in the list is removed to make room. The maximum finder is structured to keep the strongest correlation at the top of the list so it is readily available for a processing unit to access it. A processing unit, such as time/range detector 43, takes the strongest correlation from the maximum finder to process it, thereby removing it from the list. Keeping the correlation sums sorted so the maximum correlation sum is stored at the top of the list and readily available increases the chances that aligned (i.e., correct) correlation sums will not be missed. The size of the list, corresponding to the number of registers in the maximum finder, is generally set equal to the average number of correlations that the processing unit can process per code period. Approximately, a smaller size diminishes performance (e.g., the speed and reliability of detection), but a larger size merely wastes hardware resources. The faster the processing unit, the more correlation sums should be stored in the maximum finder to increase system performance.

Figure 8:
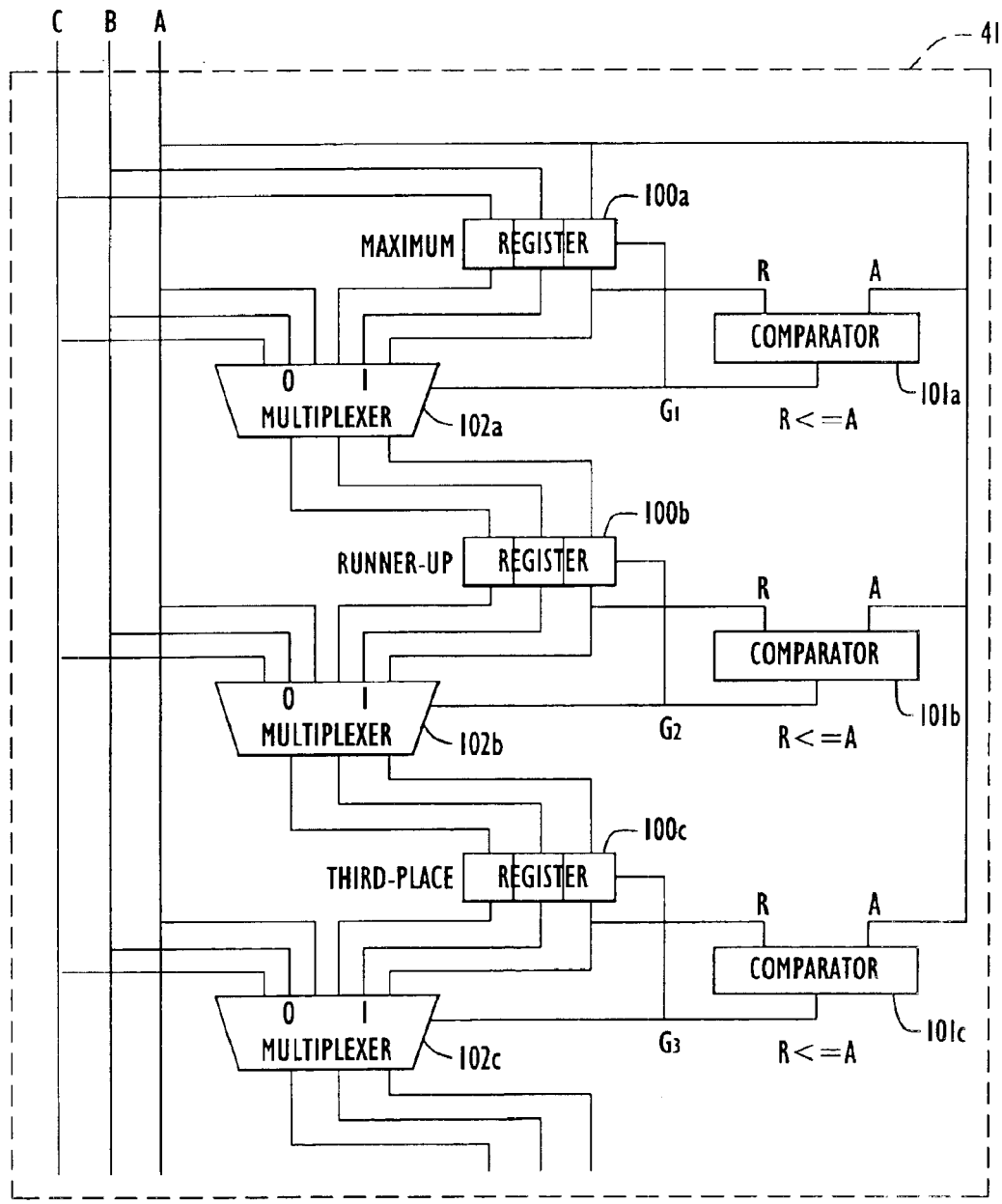
FIG. 8 is a block diagram of the maximum finder shown in FIGS. 4 and 5.

The maximum finder 42, according to one embodiment of the invention, uses the repetitive structure as shown in FIG. 8 to perform insertion sorting of the final correlation sums output from the matched filter 41. In FIG. 8, input "A" is the amplitude of the final correlation signal output from the matched filter, and inputs "B" and "C" are time-of-arrival counts corresponding to the final sums. The input B is generated by modulo N counter 53 and input C is generated by modulo L counter 54, both shown in FIGS. 5A and B. The maximum finder includes a plurality of registers, such as registers 100a through 100c shown in FIG. 8. Each register holds the values of A, B and C, namely, a final sum amplitude A, a count B from modulo N counter 53, and a count C from modulo L counter 54. The registers are arranged in FIG. 8 to show the register 10a that holds the 721 maximum sum amplitude at the top of the figure, followed by the register 100b that holds the next lower amplitude value, or "runner-up" amplitude, arranged below register 100a, and the register 100c holding the next smaller amplitude value, or the "third-place" amplitude, arranged below the runner-up register. Further registers would be arranged in a continuing similar order below the third-place register, and would hold increasingly smaller amplitude values. Each register has inputs for signals A, B and C, and corresponding outputs.

Connected to each register is a multiplexer, such as multiplexers 102a through 102c shown in FIG. 8. Each multiplexer is controlled by a comparator, such as comparators 101a through 101c shown in FIG. 8. Each comparator compares the current final sum A with the final sum R stored in the register connected to the comparator. The comparator outputs a control signal, such as signals $G_1$ through $G_3$ shown in FIG. 8, based on the comparison that controls the multiplexer connected to the outputs of that register. For example, comparator 101a compares the current final sum A with the final sum R stored in register 100a. If R is less than or equal to A, then comparator 101a outputs a control signal $G_1$ to control multiplexer 102a.

The maximum finder operates by comparing the amplitude of the current final sum signal input from the matched filter to the amplitudes of previously received final sums that have been stored in all of the registers of the maximum finder. If the amplitude of the input signal is greater than or equal to the amplitudes recorded in some of the registers, then those registers are shifted downward, as arranged in FIG. 8, and the value of the input signal's amplitude is written to the register corresponding to the highest position among those shifted values. An amplitude of zero in a register marks it as empty. This convention allows the sorting process to start with empty registers and to continue properly when not all of the registers are full.

If partial or incremental dumping is to be permitted, then the lowest registers to be dumped, as illustrated in FIG. 8, that correspond to the registers holding the smallest amplitude values to be dumped, need to be dumped first to avoid the creation of 'holes' in the middle of the data. The logic for dumping those registers is not shown in FIG. 8. However, the preferred policy for maximum performance is to choose the best data: that is, to dump from the highest register, shifting the data upward. This policy ensures that when the processing algorithm receiving the output from the maximum finder, such as time/range detector 43, cannot take data from the maximum finder as fast as it is collected, the worst data is abandoned, rather than the best.

Referring to the logic diagram of FIG. 8 and using +1 to represent an upward shift, −1 for a downward shift, and 0 for no shift, a typical shift pattern for an insertion into a register of the maximum finder would be 0,0,−1,−1, and the shift pattern for dumping would be +1,+1,+1,+1, and 0,0,0,0 for no dumping. These conflicting shifts could be done in alternate clock cycles if the clock rate were doubled, such as to twice the chip rate, but this could increase the clock rate to an undesirable degree. An alternative method is to accommodate both data movements in the same clock cycle. Adding the two example shift patterns (dumping while inserting) yields the pattern +1,+1,0,0. This pattern can be handled by designing the logic to operate like a left/right shift register. Each stage of such a register has a three-way multiplexer for selecting data from its left neighbor, right neighbor, or from the input signals.

The logic diagram of FIG. 8 is described next. Here, the registers 100a, 100b, 100c, etc. are referred to as being sequentially numbered 1,2,3, . . . , starting from the top register 101a in FIG. 8, i.e., the register holding the maximum value.

Register n is referred to as $R_n$, and $RA_n$ is the portion of the register holding the value "A." D is the dump enable signal. Comparator output $G_n$ is true when $RA_n <= A$. Accordingly, the clock should be enabled for register n when the condition {D xor $G_n$} is true, and the multiplexer inputs for register n should be enabled according to the following rules:

1) Enable input from $R_{n-1}$ when {not D and $G_{n-1}$} is true.
2) Enable input from A,B,C when {not D and not $G_{n-1}$ or D and $G_{n+1}$} is true.
3) Enable input from $R_{n+1}$ when {D and not $G_{n+1}$} is true.

These iterated rules are terminated at the top and bottom as follows:

1) At the top register, substitute A,B,C for $RA_{n-1}$ and {false} for Gn-1. Also, take the dump output directly from the input A,B,C when $G_1$ is true, else from $R_1$.
2) At the bottom register, substitute the pattern 0,X,X for $RA_{n+1}$, and {false} for $G_{n+1}$, where "X" means don't-care data.

Figure 9:
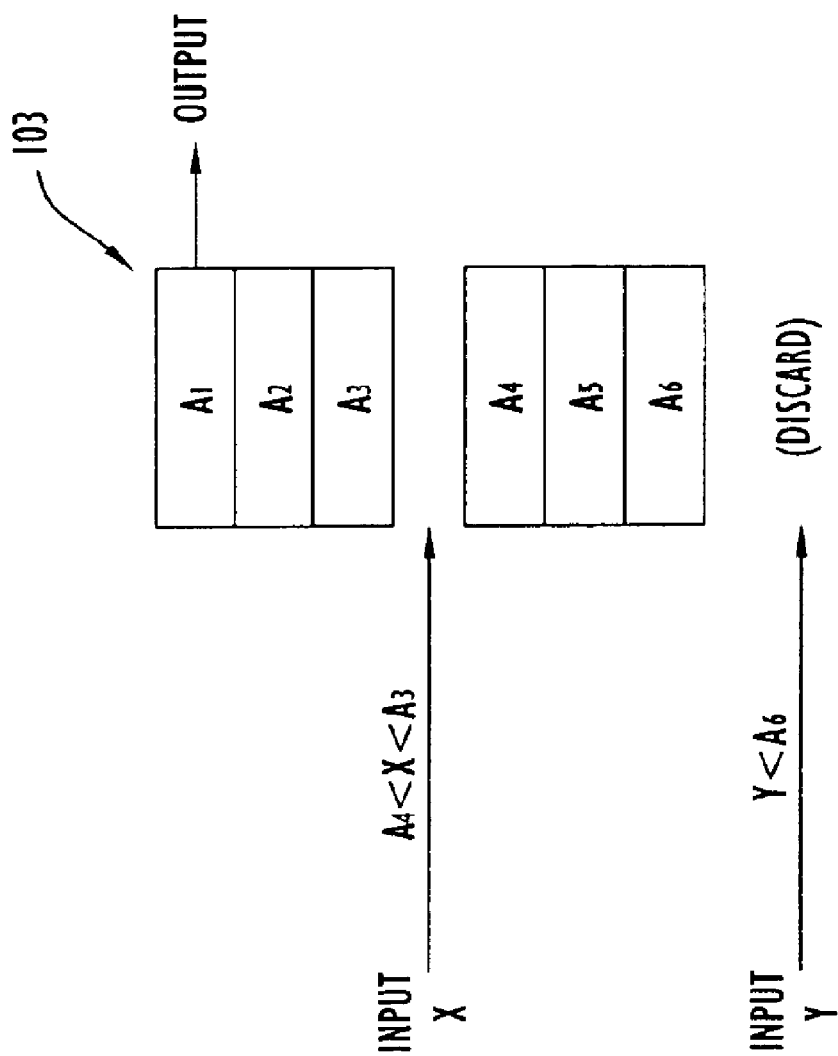
FIG. 9 is a conceptual diagram for showing the operation of the maximum finder shown in FIG. 8.

FIG. 9 is a diagram showing how two correlation sums, X and Y are input into a maximum finder ranking list. The maximum finder is conceptually illustrated here as a list 103. In the list are stored correlation sums, $A_1$ through $A_6$. These sums can be stored in registers 100a, 100b, 100c, etc. of the maximum finder shown in FIG. 8. In a first instance, a correlation sum "X" is within the range of amplitude values present in the list. Here, for example, X greater than $A_4$, but less than $A_3$. Accordingly, the maximum finder of FIG. 8 operates to insert X in the list between $A_4$ and $A_3$, and would shift $A_4$ through $A_6$ down one level in the maximum finder, assuming the list is not full. If the list is full, $A_6$ is discarded, $A_5$ is shifted into the register occupied by $A_6$, and $A_4$ is shifted into the register occupied by $A_5$, and X is stored in the register occupied by $A_4$ $A_1$ through $A_3$ are not shifted.

In the second instance, correlation sum Y is less than $A_6$. If the maximum finder ranking list is full, Y is discarded. If it is not full, Y is stored in the register below the register for $A_6$.

Having described preferred embodiments of methods and apparatuses for detecting a stationary dither code, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A dither code detector receiving a coded signal having a long code composed of a plurality of dithered codes wherein the dithered codes are dithered according to a dither pattern, the code detector comprising:
    a correlator unit correlating the coded signal with a reference code and outputting a correlation signal;
    a detector combining portions of the correlation signal according to the dither pattern and detecting the long code based on the combined portions of the correlation signal,
    wherein the detector includes
        a delay unit receiving the correlation signal and delaying it according to the dither pattern and outputting delayed correlation signals, and
        a combiner receiving the correlation signal and combining it with the delayed correlation signals and outputting a combined correlation signal, and
    wherein the delay unit includes
        a first counter counting with a first modulus corresponding to a dither of at least a first one of the dithered codes.
        a first memory storing a current portion of the correlation signal at a location according to a count of the first counter and outputting the delayed portion of the correlation signal when the first counter next addresses the location according to the first modulus, and
    wherein the combiner includes an first adder adding a delayed portion of the correlation signal with the current portion of the correlation signal and thereby generating a first combined correlation signal.

2. The dither code detector according to claim 1, further comprising a processing unit coupled to the detector and processing the detected long code to determine timing information from the received coded signal.

3. The dither code detector according to claim 1, wherein the delay unit further comprises:
    a second counter counting with a second modulus corresponding to a dither of at least a second one of the dithered codes;
    a second memory storing a combined correlation signal at a location according to the second counter and outputting a delayed combined correlation signal when the second counter next addresses the location according to the second counter modulus; and
    wherein the combiner further comprises a second adder adding the delayed combined signal with a current portion of the correlation signal and thereby generating a second combined correlation signal.

4. The dither code detector according to claim 3, wherein the code detector further comprises a maximum finder unit for arranging outputs of the second adder according to the strength of the second combined correlation signal, and if the second combined correlation signal is the largest signal among the signals arranged by the maximum finder unit, detecting a phase of the long code based on the second combined correlation signal.

5. The dither code detector of claim 1, wherein the dither pattern is a stationary dither pattern.

6. A method for detecting a coded signal having a long code composed of a plurality of dithered codes composed of codes dithered according to a dither pattern, the method comprising:
    a) correlating the coded signal and a plurality of reference codes thereby generating a plurality of correlation signals;
    b) combining the plurality of correlation signals based on the dither pattern and producing a final combined correlation signal, wherein the combining the plurality of correlation signals includes:
        b1) delaying a first one of the plurality of correlation signals by an amount equal to the period of a first one of the dithered codes;
        b2) adding the delayed correlation signal to a current correlation signal to produce a combined correlation signal;
        b3) delaying the combined correlation signal by an amount equal to the period of another one of the dithered codes;
        b4) adding the combined correlation signal delayed in b3) to a current correlation signal to produce a new combined correlation signal;
        b5) repeating b3) and b4) using delays based on the dither pattern and using the new combined correlation signal in place of the combined correlation signal produced in b2), until the adding of b4) is performed a number of times equal to the number of dithered codes present in the composite code, and then outputting the new combined correlation signal as the final combined correlation signal;

c) detecting the composite code based on the final combined correlation signal.

7. The method according to claim 6, further comprising:

d) generating a plurality of combined correlation signals; and e) arranging the plurality of combined correlation signals in order of the strength of the combined correlation signals.

8. The method according to claim 6, wherein the delaying of b3) is performed by storing the combined correlation signal in a memory at an address computed modulo N, where N corresponds to the period of said another one of the dithered codes.

9. The method according to claim 6, wherein the detecting the composite code includes:

c1) comparing the final combined correlation signal with previously generated final combined correlation signals;

c2) selecting, based on the comparison of c1), the combined correlation signal having the strongest correlation value; and, c3) detecting the composite code by determining the phase of the long code based on a receive time of the selected combined correlation signal.

10. The method according to claim 6, wherein the dither pattern is a stationary dither pattern.

* * * * *